United States Patent
Bryan

(10) Patent No.: US 9,688,049 B2
(45) Date of Patent: Jun. 27, 2017

(54) BUILDING ELEMENT AND METHOD

(76) Inventor: Steve Bryan, Nashville, TN (US)

(*) Notice: Subject to any disclaimer, the term of this patent is extended or adjusted under 35 U.S.C. 154(b) by 0 days.

(21) Appl. No.: 13/602,439

(22) Filed: Sep. 4, 2012

(65) Prior Publication Data

US 2012/0324819 A1    Dec. 27, 2012

Related U.S. Application Data

(63) Continuation of application No. 12/193,038, filed on Aug. 17, 2008, now Pat. No. 8,256,186.

(60) Provisional application No. 60/956,462, filed on Aug. 17, 2007.

(51) Int. Cl.
*B32B 3/10* (2006.01)
*B32B 15/10* (2006.01)

(52) U.S. Cl.
CPC .............. *B32B 3/10* (2013.01); *B32B 15/10* (2013.01); *B32B 2419/00* (2013.01); *Y10T 428/2495* (2015.01); *Y10T 428/24331* (2015.01); *Y10T 428/24777* (2015.01); *Y10T 428/26* (2015.01); *Y10T 428/31989* (2015.04)

(58) Field of Classification Search
CPC ....... B32B 3/10; B32B 15/10; B32B 2419/00; E04B 1/08; E04B 1/24; E04B 1/10; E04B 2001/2692; E04B 2001/26; E04B 2001/2604; E04B 2/58; E04B 2/60; E04B 2/62; E04B 2/702; E04C 3/18; E04C 3/122; E04C 3/292; E04C 3/127; E04C 2/24; E04C 2/26; E04C 2/28; E04C 2/36

USPC .. 52/653.2, 654.1, 585.1, 589.1, 592.1, 479, 52/455, 456, 457, 831, 850, 851, 852, 52/853, 854, 855, 856, 857, 836

See application file for complete search history.

(56) References Cited

U.S. PATENT DOCUMENTS

| | | | | |
|---|---|---|---|---|
| 1,156,753 | A * | 10/1915 | Carey | 52/592.1 |
| 1,578,344 | A * | 3/1926 | Munroe | 52/592.1 |
| 5,618,371 | A * | 4/1997 | Sing | 156/264 |
| 6,244,005 | B1 * | 6/2001 | Wallin | 52/293.1 |
| 6,286,287 | B1 * | 9/2001 | Dieter | 52/845 |
| 7,546,716 | B1 * | 6/2009 | Asadurian | E04C 1/395 52/223.7 |
| 2003/0182891 | A1 * | 10/2003 | Reichartz | 52/720.1 |
| 2008/0202053 | A1 * | 8/2008 | Guy et al. | 52/391 |
| 2012/0137612 | A1 * | 6/2012 | Buckholt | 52/309.4 |

* cited by examiner

*Primary Examiner* — Jessica Laux
(74) *Attorney, Agent, or Firm* — Wayne Edward Ramage; Baker Donelson

(57) ABSTRACT

A formed building element or "log" comprising a top filler section and a bottom filler section affixed on opposite sides of a center reinforcement member. The center reinforcement member may be a steel or metal rod or tube. The reinforcement member, which may be of approximately the same length of the filler sections, has one end extending out from the end of the building element. The extended end may have a vertical hole extending from top to bottom, adapted to accept a rod pin, which may or may not be threaded. Matching holes extend from the top to bottom of the filler section at the opposite end of the building element, so adjacent building elements may be attached end-to-end.

4 Claims, 3 Drawing Sheets

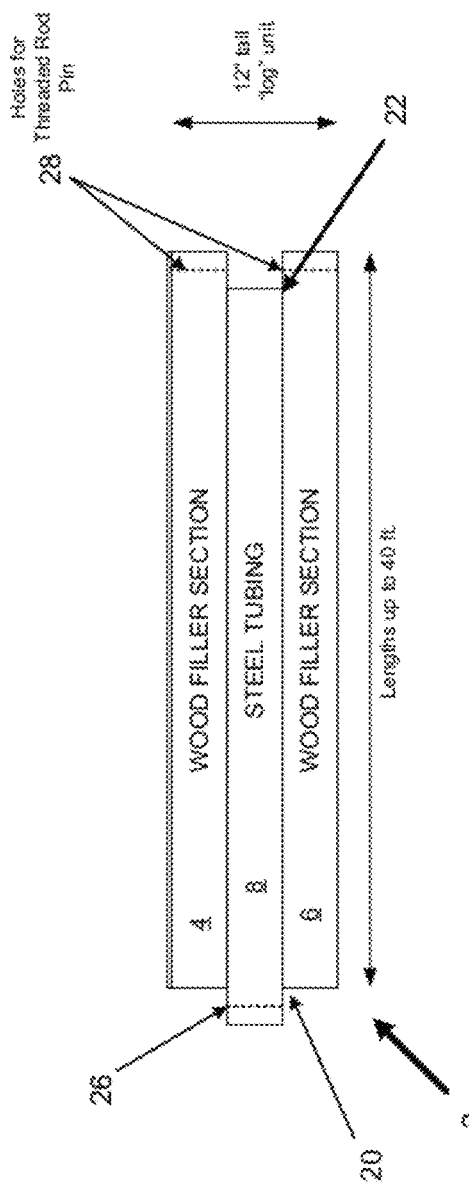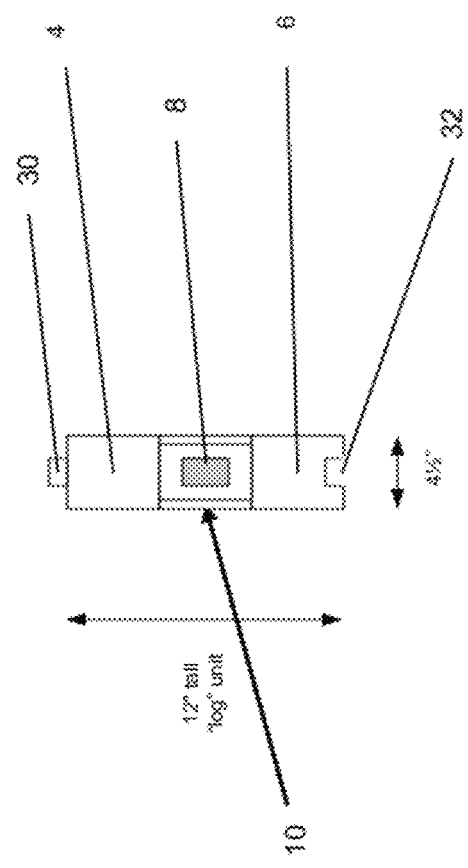

BUILDING ELEMENT AND METHOD

This application is a continuation of U.S. application Ser. No. 12/193,038, filed Aug. 17, 2008, now U.S. Pat. No. 8,256,186 which claims priority to Provisional Patent Application No. 60/956,462, filed Aug. 17, 2007, now U.S. Pat. No. 8,256,186 entitled "Building Element and Method," and is entitled to those filing dates for priority. The complete disclosure, specification, drawings and attachments of U.S. application Ser. No. 12/193,038 and Provisional Patent Application No. 60/956,462 are incorporated herein in their entireties by specific reference for all purposes.

FIELD OF INVENTION

This invention relates to a method of framing and constructing buildings by stacking formed building elements.

SUMMARY OF INVENTION

In one exemplary embodiment, the present invention generally provides a building element having a proximal end, a distal end, and a length between said proximal and distal ends, comprising a top filler section, a bottom filler section, and a reinforcement member, wherein the top filler section, bottom filler section, and reinforcement member each have first and second surfaces opposite and parallel to one another, third and fourth surfaces opposite and parallel to one another, and wherein the third and fourth surfaces are perpendicular to the first and second surfaces.

The first and second surfaces of the building element each describe a width and the third and fourth surfaces each describe a height, the top filler section, bottom filler section, and reinforcement member each have a length perpendicular to their height and width, and the top filler section, bottom filler section, and reinforcement member each have a proximal end at, approximately, the building element proximal end, and a distal end at, approximately, the building element distal end.

The top filler section second surface is affixed to the reinforcement member first surface, and the bottom filler section first surface is affixed to the reinforcement member second surface. The top and bottom filler sections may be of wood, compressed wood, wood pulp, artificial material, or other material known in the art to be used in place of wood, while the reinforcement member may be a metal rod or tube, preferably a steel tube.

In another embodiment, the reinforcement member, top filler section, and bottom filler section widths may be approximately equal to one another. The building element may then further comprise a side panel affixed to the reinforcement member third surface, the top filler section third surface, the bottom filler section third surface, any two of the third surfaces, or all three of the third surfaces. Optionally, the building element may further comprise a side panel affixed to the reinforcement member fourth surface, the top filler section fourth surface, the bottom filler fourth surface, any two of the fourth surfaces, or all three of the fourth surfaces.

In another embodiment, the top filler section and bottom filler section widths may be equal to one another but greater than the reinforcement member width. The building element may further comprise a side panel between the top filler section second surface and the bottom filler first surface, and affixed to at least the reinforcement member third surface. Optionally, the building element may further comprise a side panel between the top filler section second surface and the bottom filler first surface, and affixed to at least the reinforcement member fourth surface.

In another embodiment of the present invention, the top filler section length, bottom filler section length, and reinforcement member length are all about the same as one another. In one aspect of this embodiment, the reinforcement member proximal end extends proximally of the top filler section and bottom filler section proximal ends, and the top filler section and bottom filler section distal ends extend distally of the reinforcement member distal end. In this aspect, the building element proximal end further comprises a hole proximal to the top filler section and bottom filler section proximal ends, perpendicular to the reinforcement member width, and extending from the reinforcement member first surface to the reinforcement member second surface. The building element distal end further comprises matched holes distal to the reinforcement member distal end, perpendicular to the top filler section and bottom filler section widths, and extending from the top filler section first surface to the top filler section second surface, and from the bottom filler section first surface to the bottom filler second surface.

In another embodiment of the present invention, the top filler section first surface further comprises a tongue extending upward for at least part of the top filler section length, and the bottom filler section second surface further comprises a groove extending for at least part of the bottom filler section length, wherein the tongue is adapted to be inserted into groove.

In yet another embodiment of the present invention, the reinforcement member is 2" wide and 4" high, and the top and bottom filler sections are each 4.5" wide and 4" high, the reinforcement member is made of steel tubing and the top and bottom filler sections are made of wood, the reinforcement member proximal end extends 4.5" beyond the proximal ends of the top and bottom filler proximal ends, and the top and bottom filler distal ends extend 4.5" distally beyond the distal end of the reinforcement member distal end. In another embodiment, the top filler section first surface further comprises a tongue extending for least part of the top filler section length, and the bottom filler section second surface further comprises a groove extending for at least part of the bottom filler section length.

DESCRIPTION OF THE DRAWINGS

FIG. 1 shows a building element in accordance with one embodiment of the present invention.

FIG. 2 shows a cross-section view of a building element in accordance with one embodiment of the present invention.

DETAILED DESCRIPTION OF THE INVENTION

Figure 4:
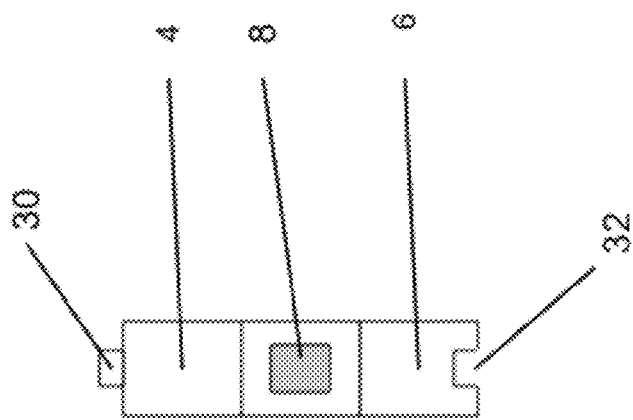
FIG. 4 shows a cross-section view of a building element in accordance with another embodiment of the present invention.

A formed building element (or "log") 2 is shown in FIGS. 1-4. The building element 2 comprises a top filler section 4 and a bottom filler section 6 affixed on opposite sides of a center reinforcement member 8. The filler sections 4, 6 may comprise wood, compressed wood or wood pulp, artificial material, or other material that is known in the art to be used in place of wood. The center reinforcement member 8 may be a steel or metal rod or tube, as shown in FIG. 1. The filler sections may be affixed to the center reinforcement member by any suitable means known in the art, including adhesives, glue, or bolting.

Figure 3:
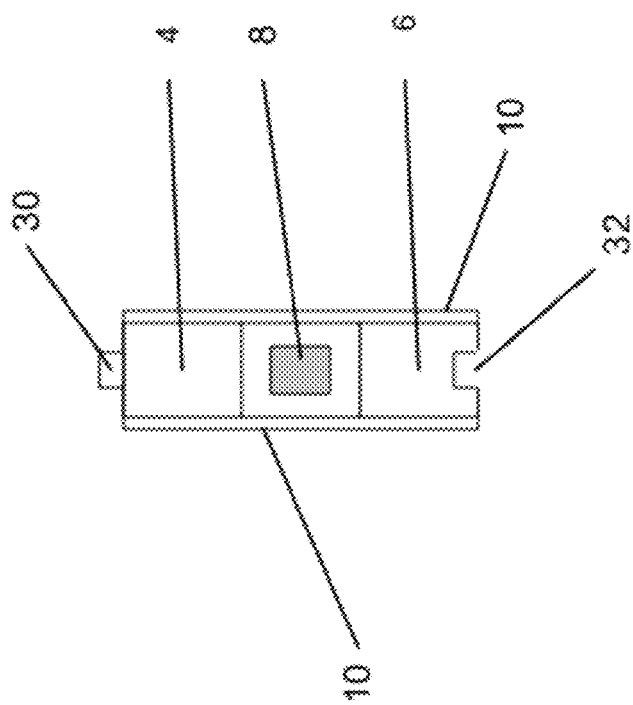
FIG. 3 shows a cross-section view of a building element in accordance with another embodiment of the present invention.

In one exemplary embodiment, the width of the center reinforcement member is the same width as the filler sections, so that the reinforcement member may be seen from the side, as seen in FIG. 3. In another exemplary embodiment, side panels 10 may be affixed to the sides of the building element. This allows other types of siding to be nailed, screwed, or otherwise affixed to the building. The side panels may extend for a portion of or the entire height of the building element as seen in FIG. 4. Alternatively, as shown in FIG. 1, the width of the center reinforcement member 8 may be slightly less than the width of the filler sections, and the side panels 10 of suitable height and depth to match the height of the center reinforcement member and be flush with the faces of the filler sections when inserted over and affixed to the reinforcement section.

In one exemplary embodiment, the reinforcement member, which may be of approximately the same length of the filler sections, has one end 20 extending out from the end of the building element, with the other end 22 withdrawn inside the building element. The extended end 20 may have a vertical hole 26 extending from top to bottom, adapted to accept a rod pin, which may or may not be threaded. Matching holes 28 extend from the top to bottom of the filler section at the opposite end of the building element. This construction enables adjacent building elements to be attached end-to-end, with the extended end 20 inserted into the space in the corresponding opposite end of the adjacent building element, whereupon a rod pin is inserted through the holes to fasten the two building elements together. In embodiments where the side panels cover only the reinforcement section, as shown in FIG. 1, the same building elements can be used to construct any configuration at desired angles, such as 90 degree corners and straight walls. If the side panels extend the entire height of the building element, then special corner building elements may be constructed so that a section of side panel on the inside of the receiving building element corresponding to the open space may be removed to allow insertion of the extended end 20 of the adjacent building element.

In yet another embodiment, the top filler section 4 may further comprise a tongue 30 extending upward for some or all of the length of the top filler section. As shown in FIG. 4, the tongue may be in the center of the top of the top filler section. The tongue is adapted to be inserted into a matching groove or notch 32 in the bottom of the bottom filler section of the vertically-adjacent building elements.

Multiple building elements can thereby be stacked on top of each other in the same horizontal plane, instead of every other row (i.e., overlapping every row).

Figure 5:
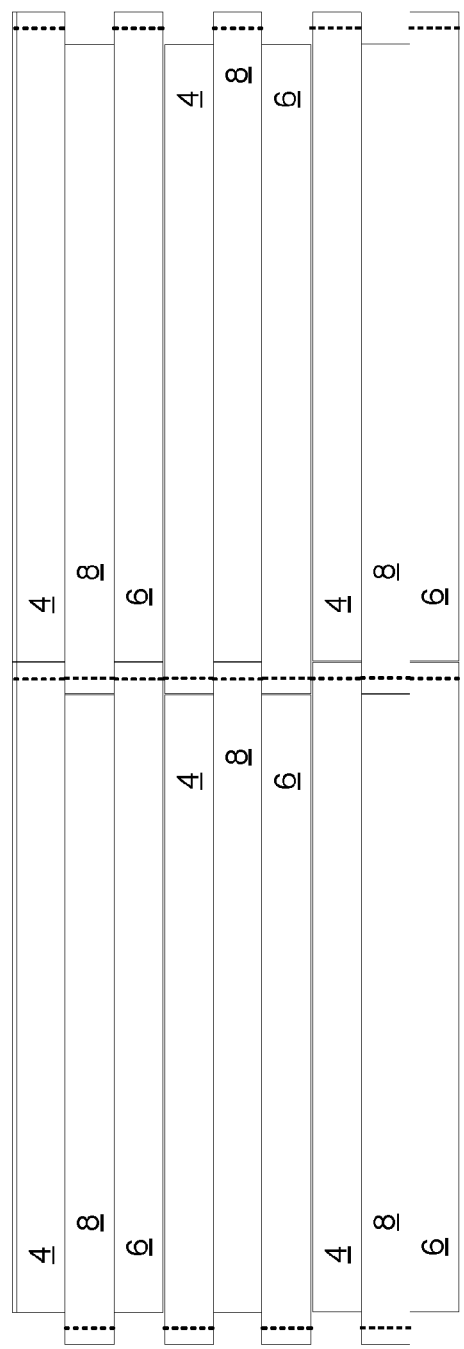
FIG. 5 shows a side view of stacked multiple building elements.

In one exemplary embodiment, the building element is 12 feet in length with 2"×4" (width×height) steel tubing as the reinforcement member. The filler sections are 4.5"×4" (width×height) sections made of wood or recycled material, and affixed to the steel tubing by bolts. The building element thus is 4.5 inches wide and 12 inches in height. The sides of the steel tubing are covered with 1.25" thick wood (or substitute) planking that matches the surfaces of the top and bottom filler sections. The steel tubing extends 4.5 inches from the end of the building element, creating a 4.5 inch notch at the opposite end. This 4.5 inch length corresponds with the 4.5 inch thickness of the building element. The building elements are then stacked horizontally with each corner or connection pinned using threaded rods and bolts through the pre-drilled holes, as seen in FIG. 5.

With the system of the present method, a building can be erected and disassembled in much less time than pre-fab or modular homes currently known in the art.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

I claim:

1. A building construction system, comprising:
   a plurality of elongated stackable building beams with a length, width, and height, each beam comprising a first end, a second end, a top side, a bottom side, a front side, and a back side;
   further wherein each beam has a length greater than its height, and its height is equal to or greater than its width;
   further wherein the front side, top side, bottom side, and back side join at right angles to form a rectangle in cross-section;
   further wherein each beam comprises three vertically stacked members of equal width extending along the length of the beam, said vertically stacked members comprising a bottom filler member permanently affixed to a central reinforcement member permanently affixed to a top filler member, wherein each member is rectangular in cross-section;
   further wherein the first end of each beam comprises a male connector and the second end of each beam comprises a female connector, wherein two beams are attachable end-to-end by insert of the male connector of one beam into the female connector of the other beam;
   further wherein at least one of said plurality of beams are positioned vertically-adjacent in a first vertical stack with said vertically adjacent beams attached by tongue-and-groove means; and
   wherein the to and bottom filler members are selected from the group consisting of wood, compressed wood, wood pulp, artificial material, and other material known in the art to be used in place of wood; and wherein the reinforcement member is a metal rod or tube.

2. The system of claim 1, further comprising a side panel affixed to the front side or back side of one or more of said plurality of beams.

3. The system of claim 1, wherein the male connector comprises an extended portion of the central reinforcement member extending lengthwise relative to the top and bottom filler members, with a hole extending vertically through the extended portion of the central reinforcement member; and
   the female connector comprises extended portions of the top and bottom filler members extending lengthwise relative to the central reinforcement member, with a hole extending vertically through the extended portions of the top and bottom filler members.

4. The system of claim 1, wherein:
   one or more beams in said plurality of beams is 12" high and 4.5" wide; and the reinforcement member of said one or more beams in said plurality of beams is made of steel tubing and the top and bottom filler sections are made of wood.

* * * * *